June 28, 1966  E. JORDAN  3,257,674
PROCESS FOR PRODUCING HELICAL LOCKING WASHERS
WITH INTERNAL TEETH Filed Oct. 29, 1963  6 Sheets-Sheet 1

Inventor:
Ernst Jordan
By Watson, Cole, Grindle & Watson
ATTORNEYS

June 28, 1966  E. JORDAN  3,257,674
PROCESS FOR PRODUCING HELICAL LOCKING WASHERS
WITH INTERNAL TEETH
Filed Oct. 29, 1963   6 Sheets-Sheet 5

Inventor:
Ernst Jordan
By Watson, Cole, Grindle & Watson
ATTORNEYS

Inventor:
Ernst Jordan
By Watson, Cole, Grindle & Watson
ATTORNEYS 3,257,674
PROCESS FOR PRODUCING HELICAL LOCKING
WASHERS WITH INTERNAL TEETH
Ernst Jordan, Leinpfad 17, Hamburg, Germany
Filed Oct. 29, 1963, Ser. No. 319,820
Claims priority, application Germany, Nov. 7, 1962,
J 22,610
4 Claims. (Cl. 10—86)

This invention is a continuation-in-part of application Serial No. 296,792, filed July 22, 1963, now abandoned, and relates to a process and apparatus for the production of helical locking washers with internal teeth inclined so as to present forward and rearward edges projecting respectively from opposite faces of each washer, the rearward edge of one tooth overlapping the forward edge of the next succeeding tooth when viewed from one face of the washer. Such washers will hereinafter for simplicity be indicated as "washers of the type referred to."

Such a washer preferably has a pair of biting edges at each end, inclined relatively to each other to include an angle that opens towards the centre of the washer, and such mutually inclined biting edges can be advantageously formed by bending in opposite directions triangular portions at the ends of the washer, the triangular portions extending wholly or only partially from the inside of the washer to the outside. Such preferable mutually inclined biting edges resist opening out of the washer when the washer is compressed in use. Since any opening out of the washer could result, in the limit, in allowing the edges of the internal teeth to be no longer in overlapping relation, the biting edges serve the very important purpose of ensuring that the teeth do remain overlapped at their edges, so that those edges remain projecting to enable the washer to perform its locking function.

The principal object of the invention is to provide a process for the production of helical locking washers of the type referred to in an expeditious manner and capable of being carried out by simple equipment.

A further object of the invention is to provide equipment for producing the washers according to the said process, the equipment being suitable for achieving a high output rate.

According to the present invention, a process for the production of helical locking washers of the type referred to comprises the steps of feeding lengthwise a continuous strip of spring metal, slitting inwardly from one edge of the strip at spaced intervals and bending to a similar inclined position each of the teeth thus formed between consecutive slits, with the forward and rearward edges projecting respectively from opposite faces of the strip, almost completely notching the strip from the same edge at intervals embracing a plurality of the said teeth, coiling the strip edgewise into a helix with the toothed edge internally of the helix, and eventually dividing the helix into individual washer portions by severance of the junction material remaining where the strip has been almost completely notched.

The strip is, of course, brought into its internally toothed form and coiled before hardening to the degree required in the final washers. The hardening may be performed on individual washer portions if these are produced by severance of the strip continuously with the coiling, or on helical lengths containing a plurality of washer portions, which portions can then be separated into fully hardened washers by snapping of the junction material at the notches.

The steps of slitting and bending to form the teeth, notching, and coiling, can be performed with great rapidity on the continuously fed strip, so that a coil of the strip can be quickly converted into a helix, the total turns of which represent a very considerable number of washer portions.

Each washer portion may consist of a single helical turn, or of more than one such turn, depending upon the spacing of the notches. A single-turn washer need not be precisely 360°; for example it may be as much as 380° or as little as 340°.

The process preferably includes the step of bending the sides of each notch to opposite faces of the strip, to form eventual biting edges at the ends of the individual washer portions.

Preferably also, the notching step is used to put the junction material at each notch into a state of stress. This facilitates the severance of individual washer portions by snapping or tearing.

The division of the strip into individual washer portions may be effected by the application of sufficient tension to the strip as it is being coiled for the strip to be pulled apart at the successive notched junctions.

Alternatively, the division of the strip may take place as each individual washer portion has been coiled, the severance being effected by pressure applied axially of each coil to snap the strip at the successive notched portions.

Apparatus according to the invention for the production of helical locking washers of the type referred to comprises two rolls, rotatable in opposite directions at the same peripheral speed, and spaced apart to receive the thickness of a continuous strip of spring metal, the peripheries of the rolls being formed as interacting blanking and punching tools, including transverse slitting tools at spaced intervals and notching tools spaced by a plurality of the slitting tools, and a wrapping mandrel to receive a slitted and notched strip emerging from the rolls and having its axis substantially at right-angles to the general plane occupied by a strip proceeding from the rolls to the mandrel, and means for driving both the rolls and the mandrel, with the peripheral speed of the mandrel at least equal to that of the rolls.

Preferably, there is associated with the mandrel a curved guide to assist in the edgewise coiling of the strip by the mandrel. This guide, moreover, is preferably part-helical, to assist in determining the pitch angle of the edgewise coiled strip.

Preferably, a pair of straightening rolls is interposed between the tool rolls and the mandrel, with means for driving the straightening rolls at the same peripheral speed as the tool rolls.

For severance of washer portions consecutively with the coiling, the apparatus may simply have the mandrel disposed at a distance beyond such straightening rolls in excess of the spacing of the notching tools of the tool rolls, with the mandrel driven at a peripheral speed in excess of that of the straightening rolls. This causes such tension to be applied to the length of strip about to undergo coiling that it is snapped at the notched junction with the succeeding length.

Alternatively, the apparatus may include a parting roller disposed with its peripheral portion alongside the mandrel, with means for driving it at a higher peripheral speed than the mandrel about an axis generally parallel to that of the mandrel. The parting roller applies pressure axially of the coiled washer portion, so as to snap the washer portion at its notched junction with the oncoming strip. If, as is shown in detail later, the apparatus is of duplex construction, one such parting roller may co-operate with both of the two mandrels provided for coiling of two strips fed together through the apparatus. The axis of the parting roller may be out of precise parallelism to that of the mandrel by an angle such that the general plane of the roller corresponds to the pitch angle of the helix produced by the mandrel.

Further objects of the invention, and features of the process and apparatus for their fulfilment, will appear from the following description of the invention with reference to the accompanying drawings, in which.

Figure 1:
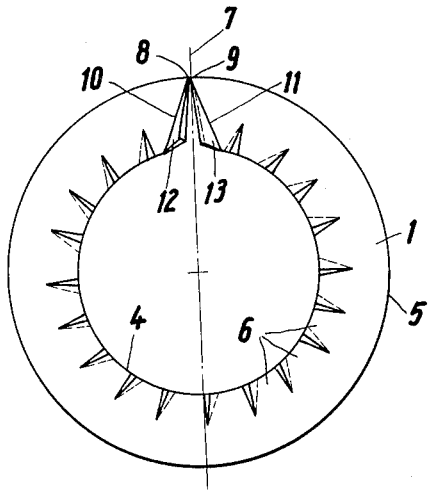
FIGURE 1 is a plan view of one construction of locking washer to be made in accordance with the invention.
Figure 2:
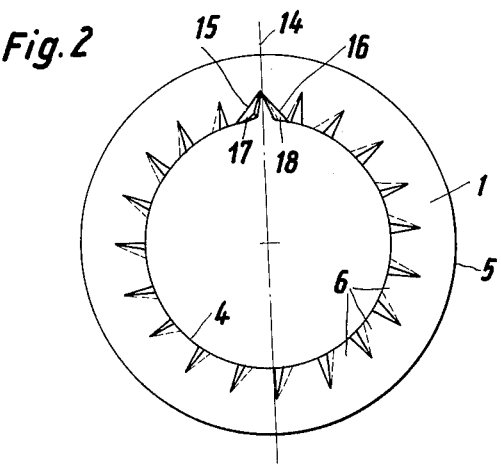
FIGURE 2 is a plan view of another construction of locking washer.
Figure 3:
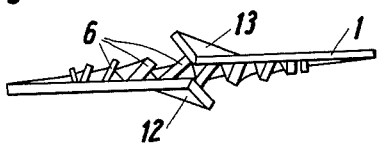
FIGURE 3 is a side elevation of the washer of FIGURE 1, as viewed from the top of that figure.

FIGURES 1 and 2 show a single-turn locking washer 1, produced by coiling straight strip on edge after blanking and punching, to provide a toothed inner edge 4 and a plain outer edge 5, with oblique teeth 6 that overlap each other along the inner edge 4. FIGURE 3 shows that the body of the washer 1 is a helix. In FIGURE 1 the ends of the washer 1 are symmetrical to a radial plane 7, and from outer corners 8 and 9 in that plane there are lines of bending, 10 and 11 extending to the inner edge 4 in such a way as to form an inwardly diverging angle. The resultant corners 12 and 13 are bent respectively upwardly and downwardly from the lines of bending 10 and 11, as shown in FIGURE 3, to form substantially triangular gouging edges, in accentuated continuation of the helix of the body of the washer.

In FIGURE 2, the ends of the washer 1 run inwardly along a radial plane 14 until lines of bending 15 and 16, extending to the inner edge 4, form smaller corners 17 and 18 than the corners 12 and 13 of FIGURES 1 and 3, again bent helically in similar manner.

Figure 4:
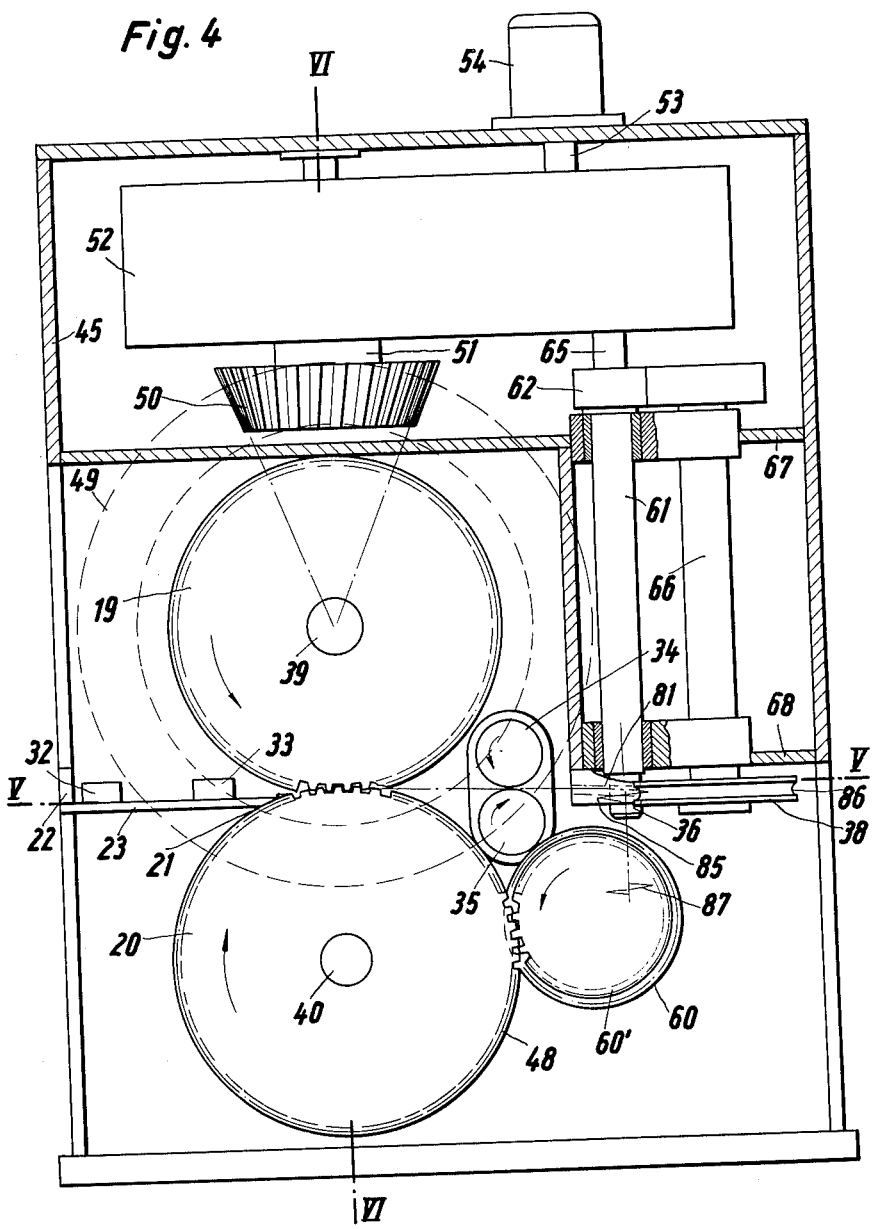
FIGURE 4 is a diagrammatic side elevation of washer-making apparatus according to the invention, partly in section and with a front coverplate removed.
Figure 5:
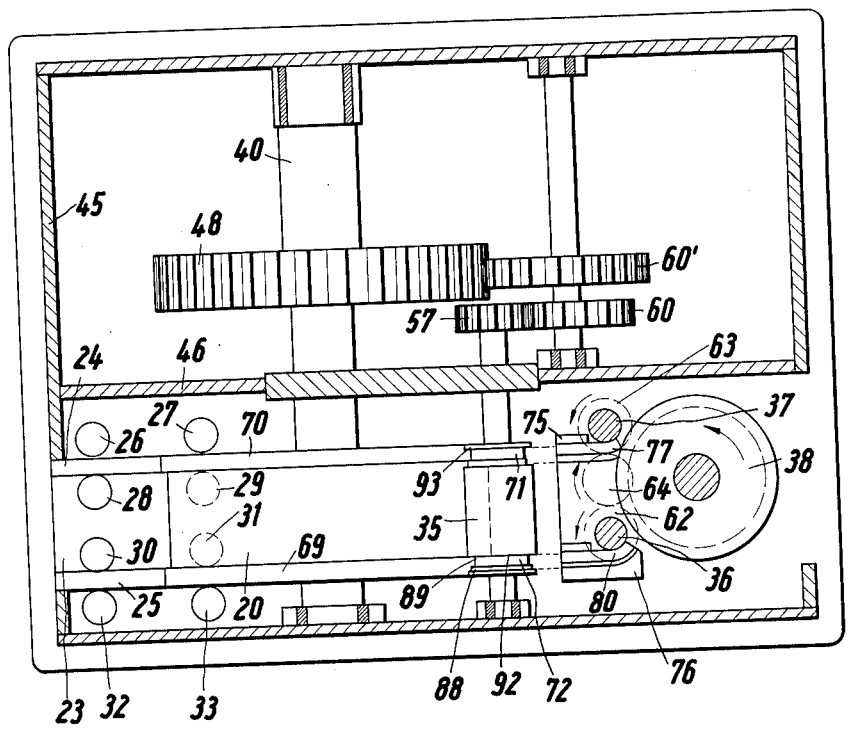
FIGURE 5 is a section taken on the line V—V in FIGURE 4.
Figure 6:
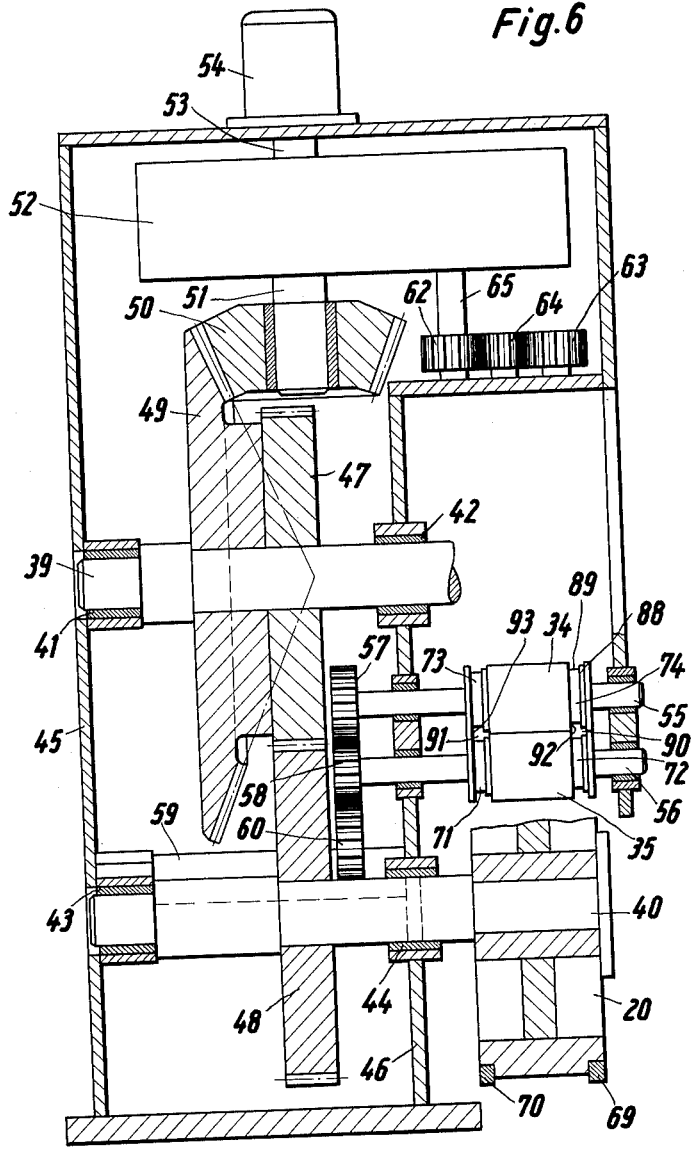
FIGURE 6 is a section taken on the line VI—VI of FIGURE 4.

In FIGURES 4 to 6 is shown a preferred duplex apparatus for producing locking washers from two strips of material simultaneously.

A combined blanking and punching tool has two rolls 19 and 20 with interengaging profiled peripheries. Two strips enter by an inlet hole 22 in the housing 45 and pass over a table 23 set tangentially and ending close to the rolls 19 and 20, with side positioning rollers 26, 27, 28, 29, 30, 31, 32, and 33 to hold the strips straight in their actual paths 21, which may be determined by grooves 24, 25 (FIGURE 5). Beyond the rolls 19 and 20, the feed paths 21 pass between a pair of straightening rolls 34 and 35, and beyond the straightening rolls 34 and 35 wrapping mandrels 36 and 37 project into the feed paths. The wrapping mandrels 36 and 37 are shown as operating in conjunction with a parting roller 38, disposed alongside them but only acting with them through the medium of the strip material. However, as already indicated and as to be further exlained below, the parting roller 38 is not an essential element of the apparatus.

The rolls 19 and 20 are mounted on shafts 39 and 40 rotating in bearings 41, 42 and 43, 44 in the housing 45 and a partition 46. The shafts 39 and 40 carry meshing gears 47, 48. The shaft 39 also carries a bevel gear 49 connecting it through a second bevel gear 50 to the output shaft 51 of a gear box 52. The input shaft 53 of this transmission is connected to a driving motor 54 or other driving unit. The straightening rolls 34, 35 are mounted on parallel shafts 55, 56, which carry meshing gears 57, 58. The gear 58 meshes with a pinion 60 on a layshaft 59, driven by the gear 48 through a pinion 60'. The drive is so arranged that rolls 19 and 20 run in the direction indicated by the arrows (FIGURE 4) and the described transmission similarly rotates the straightening rolls 34, 35 in the same feed direction.

The wrapping mandrels 36 and 37 are formed on the ends of shafts 61, which carry pinions 62, 63 connected by an intermediate pinion 64, which is driven by a second output shaft 65 of the gear box 52, to rotating the mandrels 36 and 37 in the direction of the arrows in FIGURE 5, i.e. both in the same direction. A drive shaft 66 for the parting roller 38, which rotates in the direction of the arrow shown in FIGURE 5, can conveniently be driven by the intermediate pinion 64. The shafts 61 and 66 are journalled in partitions 67, 68 in the housing 45, as indicated in FIGURE 4.

It can be seen from FIGURES 5 and 6 that the tool rolls 19, 20 have two tool rims 69, 70 and the straightening rolls 34, 35 two straightening necks 71, 72 and 73, 74 to deliver to the two wrapping mandrels 36, 37 two separate strips, fed along the grooves 24, 25 on the guide table 23. In a manner to be described later, these strips are blanked and punched by the tool rolls 19, 20, and then straightened by the straightening rolls 34, 35 before being fed to the wrapping mandrels 36, 37. It should be noted in this connection that each wrapping mandrel is fitted with a rolling-in guide 75 or 76 to engage the edge of the strip that forms the outer edge 5 of the locking washer by a curved tongue 77 or 80 concentric to the wrapping mandrel 36 or 37, to coil the strip on edge and also to alter its plane of forward travel as shown at 81 in FIGURE 4. Each still continuous strip is thus brought into the helical form indicated by dotted line 85.

The tool rolls 19, 20 and the straightening rolls 34, 35 run at the same peripheral speed. The wrapping mandrels 36, 37 may run at that same peripheral speed if they operate in conjunction with a parting roller 38, when the roller 38 runs at a higher rotary speed than the mandrels.

However, provided that the distance from the straightening rolls 34, 35 to the mandrels 36, 37 is in excess of the length of strip to be coiled into a washer portion, and provided that the mandrels 36, 37 have a higher peripheral speed than the straightening rolls, snapping of the strip is effected by the tension imparted by the mandrels. The tension acts on the successive parting points of the strip, which, as described later, have their material locally stressed, and the tension therefore snaps the strip at these points. Each length of strip is then coiled by one of the mandrels, to leave the mandrel as a complete washer portion, to fall freely as indicated by the broken line 87.

If, however, the parting roller 38 is used, the mandrels 36, 37 not only have the same peripheral speed as the straightening rollers 34, 35, but are spaced from the rollers 34, 35 by less than the length of strip to be coiled into a washer portion. The parting roller 38, operating at a greater peripheral speed than the mandrels, snaps the strips at their parting points by axial pressure applied as each washer portion has been coiled by the guide 75 and the tongue 76, again to fall freely as indicated by the broken line 87.

Since the parting roller 38 acts on each strip in the feed path 21 on the side away from the wrapping mandrels 36, 37, where the said strip is displaced downwards from the feed path by the amount of the helical pitch, the parting roller is, as shown in FIGURE 4, in a lower plane than the feed path. The parting roller 38 has a peripheral recess 86 wider than the axial length of each locking washer, since the washer enters obliquely into the recess. The one parting roller serves both wrapping mandrels 36, 37. The distance from the root of the recess 86 to the surface of each wrapping mandrel corresponds to the width of the material strip or is somewhat smaller, so that the latter is entrained by the frictional action of the parting roller 38 and forced round the wrapping mandrels, aided by the fact that the latter are also driven. This ensures parting at the locally stressed parting points of the coiled strip.

Although the shaft 66 is shown with a rigid mounting in the partitions 67, 68, it is within the scope of the invention to fit powerful springs to force shaft 66 and the parting roller 38 towards the wrapping mandrels 36, 37, to assist in the parting action.

The straightening necks, 73, 74 of the rolls 34, 35 each consist of two adjacent peripheral recesses 88, 89, the recess 88 being shallower than the recess 89, the two defining guide orifices 90, 91 between the rolls. These guide orifices 90, 91 have a narrower section formed by the recesses 88 and a wider section formed by recesses 89. In the narrower section the body of the material strip is positively fed, i.e. nipped between the straightening rolls, while the oblique teeth 6 move through the wider section, where they are aligned by the action of faces 92, 93. In this way an adequate straightening action is attained even by a single pair of straightening rolls. The use of additional straightening rolls, e.g., with a vertical axis, is not however precluded.

As seen in FIGURE 4, the rolling-in guides and tongues 75, 76 of FIGURE 5, have slit-shaped guideways 81, so dimensioned that the straightened strip from straightening rolls 34, 35 is gripped, but with its teeth 6 lying outside the guide slit. Contact between the oblique front faces of the teeth and the wrapping mandrels 36, 37 positively forces the strip into the above-mentioned guide slits, thus ensuring positive feed along the helical path.

Figure 7:
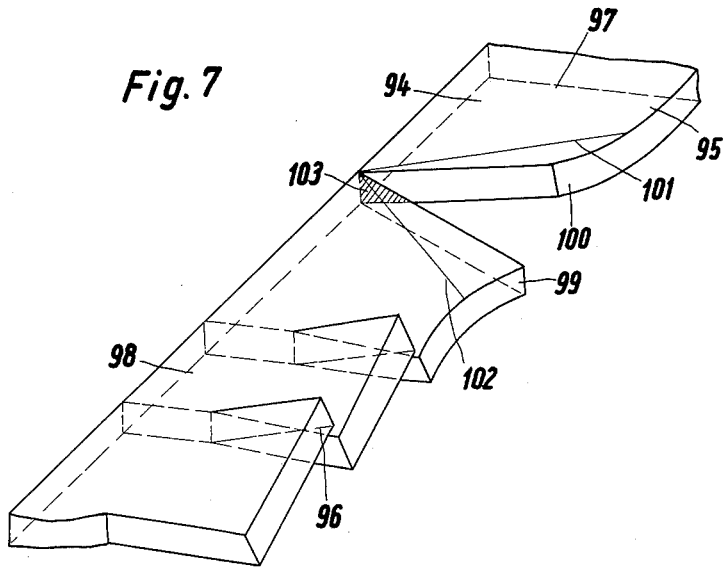
FIGURE 7 is a perspective view of a fragmentary length of blanked and punched strip showing the junction between two washer portions, not yet parted.

In FIGURE 7, a blanked and punched strip of material 94 is shown with two washer portions 95, 96 not yet parted. In each portion body sections 97, 98 still remain continuous, with the teeth projecting from them. Biting edges 99, 100 lie at each aside of the parting position, each being bent out about an oblique line 101, 102 extending over the entire width of the strip 94. It can be seen that when the material is displaced the substantially triangular section 103 is left as a particularly thin connecting section, even though the biting ends virtually extend from side to side of the locking strip.

Figure 8:
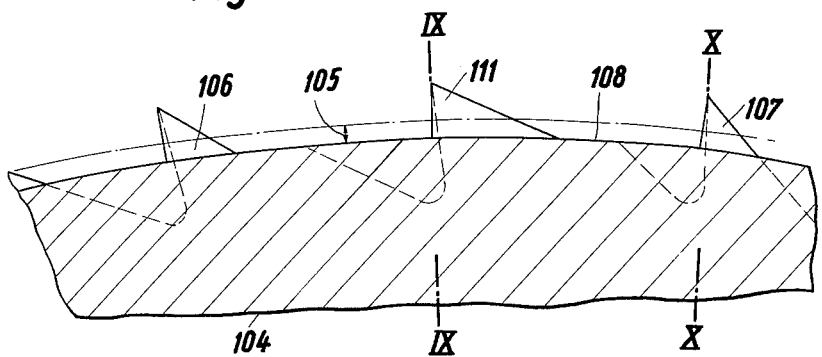
FIGURE 8 is a side elevation of a blanking and punching tool roll, in section in a plane VIII—VIII (FIGURES 9 and 10) at right-angles to the roll axis.
Figure 9:
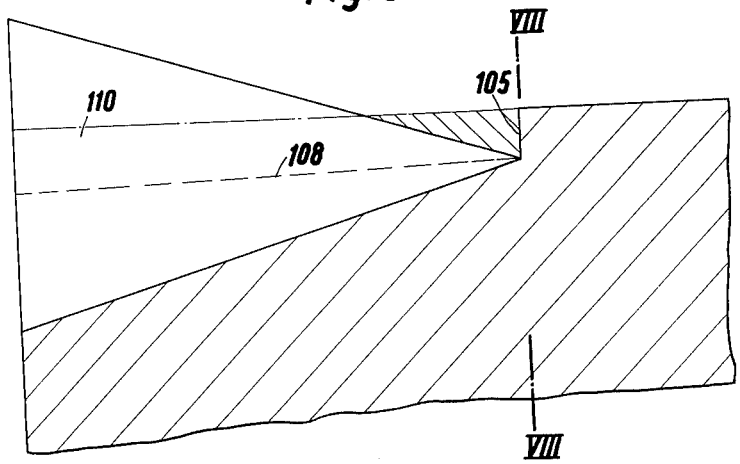
FIGURES 9 and 10 are sections taken on the lines IX—IX and X—X respectively of FIGURE 8, to a larger scale.
Figure 10:
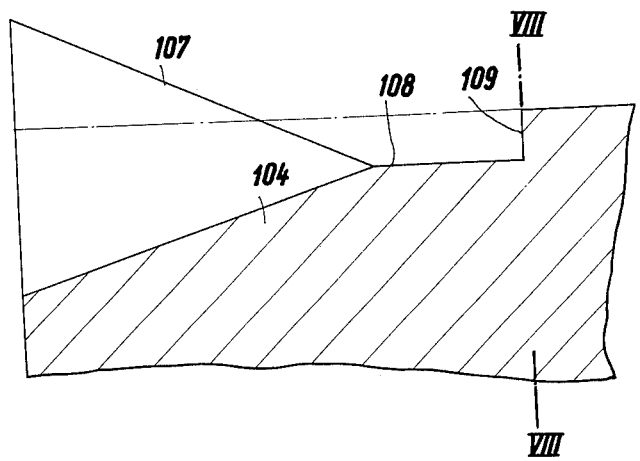

FIGURE 8 shows a peripheral section 104 of the tool rim (as 69, 70, FIGURE 5) of a tool rolls 19, 20. The tool rolls are dimensioned so that the peripheral length equals a multiple, say four, of the length of strip required for each washer. FIGURE 8 shows a section containing a parting point between two such lengths. FIGURES 9 and 10 show that the rolls have peripheral grooves offset by a step 105. Twice the height of the step 105 corresponds to the thickness of the material strip used for the locking washers.

At a distance from the parting point between two locking strips, indicated by line IX—IX (FIGURE 8), projecting teeth 106, 107 are provided, one of these (107) being shown in FIGURE 10 (section X—X in FIGURE 8). This triangular-faced tooth ends at a distance from step 105 equal to the untoothed width of the strip. The face 107 (FIGURE 10) runs obliquely above and below the root face 108 of the tool 104, this also being shown in FIGURE 8 by broken lines. The rounding and chamfering shown on the profiles formed by the projecting sections are intended to avoid stresses in the tool material on the one hand and to ensure correct engagement of the pair of tools on the other. It can be seen from FIGURE 9 that the face 110 (corresponding to profile 111 of FIGURE 8) extends over the entire width of the tool root face 108, i.e., up to the step 105, the same considerations applying to the face 107 of the other tool roll. In FIGURE 9 the remaining triangular cross-section between the step 105 and the boundary of the face 110 in relation to the line of separation between the tools has been cross-hatched to show the half of the section face in the drawing in FIGURE 7, where the remaining section between adjacent washer portions is denoted by 103. It is evident from FIGURE 9 that this triangular connecting section is formed by compressing material of the strip by the action of the two tool rolls, the local stressing being beneficial in causing the strip portions to separate easily, whether by tension applied by the mandrels 36, 37 alone, or by axial pressure applied by the parting roller 38 when the latter is used.

What I claim is:
1. A process for the production of helical locking washers having internal, inclined, and overlapping teeth, comprising the steps of feeding lengthwise a continuous strip of spring metal, slitting inwardly from one edge of the strip at spaced intervals and bending to a similar inclined position each of the teeth thus formed between consecutive slits, with the forward and rearward edges projecting respectively from opposite faces of the strip, almost completely notching the strip from the same edge at intervals embracing a plurality of the said teeth, coiling the strip edgewise into a helix with the toothed edge internally of the helix, and eventually dividing the strip into individual washer portions as each individual washer portion has been coiled, by applying axial pressure to the coiled portion to snap the strip at each successive notched junction.

2. A process as in claim 1, including the step of bending the sides of each notch to opposite faces of the strip, to form eventual biting edges at the ends of the individual washer portions.

3. A process as in claim 1, wherein the notching step is used to put the junction material at each notch into a state of stress.

4. A process for the production of helical locking washers having internal, inclined, and overlapping teeth, said process including the steps of continuously feeding a strip of spring metal, repeatedly slitting it partially from one edge and simultaneously bending the portions between the slits into teeth inclined lengthwise of the strip, repeatedly slitting the strip to a greater extent at intervals of several teeth, coiling the strip edgewise, with the teeth on the inside, to form helical turns in which the distance between the slits of greater length is at least equal to about one 360° turn, and eventually separating the turns at the slits of greater length into individual washer portions, the slitting to a greater depth being accompanied by bending of triangular end portions into projection from opposite faces of the strip, leaving junction material at the end of each slit in a state of stress, the eventual severance being effected by snapping the stressed junction material.

References Cited by the Examiner

UNITED STATES PATENTS

| | | | |
|---|---|---|---|
| 1,963,027 | 6/1934 | Olson | 10—86 |
| 2,098,840 | 11/1937 | Thode | 10—86 X |
| 2,247,981 | 7/1941 | Washer | 10—86 |
| 2,410,204 | 10/1946 | Cummins | 10—73 |
| 2,842,181 | 7/1958 | Machac | 10—86 X |
| 2,867,824 | 1/1959 | O'Connor | 10—86 |
| 3,086,228 | 4/1963 | Mellowes | 10—73 |

ANDREW R. JUHASZ, *Primary Examiner.*

WILLIAM W. DYER, JR., *Examiner.*

F. T. YOST, *Assistant Examiner.*